United States Patent [19]

Auzenne et al.

[11] Patent Number: 5,995,946
[45] Date of Patent: Nov. 30, 1999

[54] SYSTEM AND METHOD FOR ESTABLISHING AND MANAGING LINKS AMONG CUSTOMER ACCOUNTS MAINTAINED WITHIN A TELECOMMUNICATIONS SYSTEM

[75] Inventors: Michael Auzenne, Burke; Sarah Ayling, Springfield, both of Va.; Michael Forrer, Washington, D.C.; Raghu Reddy, Annadale, Va.; James Seymour, Burke, Va.; Darryl Temmel, Herndon, Va.; Havsan Zainal, Alexandria, Va.

[73] Assignee: MCI Communications Corporatioin, Washington, D.C.

[21] Appl. No.: 08/963,020

[22] Filed: Nov. 3, 1997

[51] Int. Cl.$^6$ .............................. G06F 17/60; G06F 17/30

[52] U.S. Cl. .................................................. 705/34; 707/2

[58] Field of Search ................................ 705/1, 34; 707/2

[56] References Cited

U.S. PATENT DOCUMENTS 5,696,906  12/1997  Peters et al. ............................. 395/234
5,842,196  11/1998  Agarwal et al. ............................ 707/2

*Primary Examiner*—Allen R. MacDonald
*Assistant Examiner*—Susanna Meinecke-Díaz

[57] ABSTRACT

A system and method for managing and providing customer account information within a telecommunications system include and involve a data storage system for storing a link record corresponding to a customer account managed by an account management system maintained within the telecommunications system, and a processor that is coupled to the data storage system. The processor is operative to receive a message containing a process request related to the customer account from a requesting system, to convert the message into a process object, to retrieve the link record from the data storage system in accordance with the process object, to generate a response message including the link record, and to submit the response message to the requesting system.

28 Claims, 14 Drawing Sheets

Error Response

Error response information will be returned in the ISM Message Body if an error occurs which prevents processing of the input message.

<u>IDENTIFIED BY:</u> "ERROR" in the Response code field of the ISM Message Header.

<u>FORMAT:</u>
    Error Code                                CHAR 8
    Error Message                        CHAR 256.

FIG. 4A

Confirmed Link of Accounts Request

<u>IDENTIFIED BY:</u> Message ID = CONLINKI
All fields are required excepted where noted.

<u>FORMAT:</u>

| Field | Type |
|---|---|
| Account Folder ID | CHAR 12 |
|     (for new folder, use "NEW_FOLDERID") | |
| Link Source | CHAR 8 [e.g. "SYSTEM1"] |
| Link Reason | CHAR 15 (optional) |
| Update User ID | CHAR 8 |
| Number of Accounts | CHAR 4 |
| Account Data (for each account) | |
|     Account Number | CHAR 30 |
|     Account System Code | CHAR 4 |
|     Account Activation Date | CHAR 8 |
|     Account Deactivation Date | CHAR 8 (optional) |

FIG. 4B

Confirmed Link of Accounts Reply

IDENTIFIED BY: Message ID = CONLINKO

FORMAT:
    Message Input Data:
| | |
|---|---|
| Account Folder ID | CHAR 12 |
| Link Source | CHAR 8 |
| Link Reason | CHAR 15 |
| Update User ID | CHAR 8 |
| Number of Accounts | CHAR 4 |
| Account Data (for each account) | |
|     Account Number | CHAR 30 |
|     Account System Code | CHAR 4 |
|     Account Activation Date | CHAR 8 |
|     Account Deactivation Date | CHAR 8 |
| Resulting Account Folder Contents | |
| Account Folder ID | CHAR 12 |
| Number of Accounts | CHAR 4 |
| Account Data (for each account) | |
|     Account Number | CHAR 30 |
|     Account System Code | CHAR 4 |
|     Account Link Type | CHAR 4 |
|     Account Link Date | CHAR 8 |
|     Account Unlink Date | CHAR 8 |
|     Account Activation Date | CHAR 8 |
|     Account Deactivation Date | CHAR 8 |
|     Link Reason | CHAR 15 |

Unlink Accounts Request

IDENTIFIED BY: Message ID = UNLINKAI
All fields are required.

FORMAT:
| | |
|---|---|
| Account Folder ID | CHAR 12 |
| Unlink Source | CHAR 8 [e.g. "SYSTEM1"] |
| Update User ID | CHAR 8 |
| Number of Accounts | CHAR 4 |
| Account Data (for each account): | |
|     Account Number | CHAR 30 |
|     Account System Code | CHAR 4 |

FIG. 4D

Unlink Accounts Reply

IDENTIFIED BY: Message ID = UNLINKAO

FORMAT:
    Message Input Data:
        Account Folder ID                   CHAR 12
        Unlink Source                        CHAR 8
        Update User ID                     CHAR 8
        Number of Accounts               CHAR 4
            Account Data (for each account):
            Account Number                 CHAR 30
            Account System Code          CHAR 4
    Resulting Account Folder Contents
        Account Folder ID                   CHAR 12
        Number of Accounts               CHAR 4
        Account Data (for each account)
            Account Number                 CHAR 30
            Account System Code          CHAR 4
            Account Link Type               CHAR 4
            Account Link Date               CHAR 8
            Account Unlink Date            CHAR 8
            Account Activation Date        CHAR 8
            Account Deactivation Date     CHAR 8
            Link Reason                     CHAR 15

FIG. 4E

View Linked Accounts Query

IDENTIFIED BY: Message ID = VIEWLNKI
All fields are required.

FORMAT:
    Account Number                     CHAR 30
    Account System Code            CHAR 4

FIG. 4F

View Linked Accounts Response

IDENTIFIED BY: Message ID = VIEWLNKO

FORMAT:
    Message Input Data:
        Account Number                    CHAR 30
        Account System Code               CHAR 4
    Resulting Account Folder Contents
        Account Folder ID                   CHAR 12
        Number of Accounts                CHAR 4
        Account Data (for each account)
            Account Number                  CHAR 30
            Account System Code            CHAR 4
            Account Link Type               CHAR 4
            Account Link Date               CHAR 8
            Account Unlink Date             CHAR 8
            Account Activation Date       CHAR 8
            Account Deactivation Date     CHAR 8
            Link Reason                       CHAR 15

FIG. 4G

Deactivate Account

IDENTIFIED BY: Message ID = DEACTACT
All fields are required.

FORMAT:
    Deactivate Account
        Source System Account         CHAR 30
        Source System Code             CHAR 4
        Account Activation Date        CHAR 8
        Account Deactivation Date      CHAR 8
        Update Source                   CHAR 8

FIG. 4H

Reactivate Account

<u>IDENTIFIED BY:</u> Message ID = REACTACT
All fields are required.

<u>FORMAT:</u>
    Reactivate Account

| | |
|---|---|
| Source System Account | CHAR 30 |
| Source System Code | CHAR 4 |
| Account Original Activation Date | CHAR 8 |
| Account Reactivation Date | CHAR 8 |
| OCIS Busid | CHAR 5 [Only required if Source System Code = OCIS] |
| Source | |
| Update Source | CHAR 8 |

SYSTEM AND METHOD FOR ESTABLISHING AND MANAGING LINKS AMONG CUSTOMER ACCOUNTS MAINTAINED WITHIN A TELECOMMUNICATIONS SYSTEM

BACKGROUND OF THE INVENTION

1. Field of the Invention

The present invention relates to systems used to manage customer accounts within telecommunications systems.

2. Description of the Related Art

It is well known that the telecommunications industry is extremely competitive. As such, telecommunications companies often have to introduce new systems and corresponding services to attract and maintain customers. However, with each new system and corresponding service that is introduced to customers in the telecommunications marketplace, a host of infrastructure issues centered around customer account management and the like is realized. As such, to effectively bring new telecommunications services to market quickly (e.g., long distance services, cellular telephony services, paging services, Internet services, etc.), telecommunications companies must engineer corresponding new and enhanced customer account management systems to manage new and existing customer accounts in ways that model particular business strategies.

In the past, to bring new telecommunications services to market, companies resorted to developing dedicated data processing systems that did not allow for easy service customer portfolio expansion. Each new telecommunications service that was offered required a new, dedicated customer account management system. In turn, each new customer account management system required significant resources and time to properly implement and deploy. As such, telecommunications companies often were not able to effectively and efficiently bring new services to market and, as a result, were not able to effectively compete in the telecommunications marketplace.

In addition to having to design and implement new, dedicated customer account management systems to support each new service, telecommunications companies have found themselves operating a host of disparate, unconnected data processing systems to manage customer accounts associated with a variety of service offerings. Such disparate systems also often frustrate customers who maintain more than one service account and either must receive a corresponding number of billing statements or engage in customer service activities for each individual account. Additionally, in many cases, telecommunications companies have found themselves maintaining older legacy systems that, for one reason or another, are based on technologies that are no longer current. Such out-of-date systems often embody architectures that are quite burdensome to maintain. Yet, despite the burdens associated with operating older, dedicated customer account management systems, telecommunications companies must continue to maintain existing data system in order to support their service offerings and, ultimately, their customers.

As such, to address the problems associated with implementing new and operatively disparate systems to manage customer accounts and support a variety of telecommunications services, companies have employed teams of personnel and expended significant resources to build bridging systems to couple and attempt to integrate their system. Such bridging systems have been implemented to allow consolidated customer service account management, provide consolidated billing statements, and to allow internal processing for forecasting and creating add-on sales opportunities. Although such bridging systems allow limited cross referencing of account information, they merely solve particular data consolidation needs among systems that are already known and implemented. Such dedicated bridging systems do not easily allow for service offering expansion and enhancement and do not contemplate future commercial telecommunications offerings. In essence, such bridging systems attempt to solve business needs by statically providing particular technical solutions. As such, telecommunications companies have found themselves in a vicious cycle of responding to the needs of the marketplace and having to develop systems that can manage customer accounts in the context of new and improved telecommunications services.

Thus there exists a need to provide an improved account management system that can adapt to changing market needs by allowing fast integration of new telecommunication services and which, at the same time, allows seamless integration among legacy telecommunications account management systems. To be viable, such a system must be able to support telecommunications systems and services that have particular account management needs that are based on corresponding particular business rules. Finally, such a system must be based on an integration paradigm that can take advantage of modern computer design principles such as those supported by object-oriented techniques and which encapsulate business rules in an object-oriented or other similar environment.

SUMMARY OF THE INVENTION

In view of the foregoing comments, it is a principle object of the present invention to solve the aforementioned problems associated with the related art.

It is another object of the present invention to provide a system and method for establishing and managing links among customer accounts maintained within a telecommunications system.

It is still another object of the present invention to provide a system and method for managing links among customer accounts maintained within a telecommunications system which can accommodate new and enhanced telecommunications service offerings without requiring corresponding dedicated customer account management systems to be designed and implemented.

It is still another object of the present invention to provide a system and method for managing links among customer accounts maintained within a telecommunications system which will allow legacy systems to be efficiently integrated into new and future telecommunications systems and services.

It is still another object of the present invention to provide a system and method for managing links among customer accounts maintained within a telecommunications system which allows standardized system process messages to be passed among functional components to effectuate particular service operations.

It is still another object of the present invention to provide a system and method for managing links among customer accounts maintained within a telecommunications system which allows standardized messages to be converted into objects which may be processed by computing agents which encapsulate business rules.

By achieving the aforementioned objects, the present invention provides certain benefits. For example, telecommunications companies will be able to integrate legacy systems into modern systems to offer enhanced, enriched service portfolios to customers. Moreover, telecommunications companies will be able to better serve their customers by linking customer account information for internal (e.g., resource forecasting) and external (e.g., consolidated billing) purposes. Telecommunications customers will benefit from the present invention by being able to establish multiple service accounts which can be linked on single billing statements and which can be consolidated during service inquiries and changes.

The present invention achieves the aforementioned objects and delivers the above-stated benefits by providing a system for managing customer account information within a telecommunications system, that includes a data storage system storing a link record corresponding to a customer account, managed by an account management system, maintained within the telecommunications system; and a processor that is coupled to the data storage system. The processor is operative to: receive a message containing a process request related to the customer account from a requesting system; to convert the message into a process object; to retrieve the link record from the data storage system in accordance with the process object; to generate a response message including the link record; and to submit the response message to the requesting system.

According to another aspect of the present invention, a method for managing and providing customer account information within a telecommunications system is defined. The method includes the steps of storing a link record corresponding to a customer account in a data storage system. The customer account is managed by an account management system maintained within the telecommunications system. The method also includes a step of receiving a message from a requesting system. The message contains a process request related to the customer account. The requesting system is maintained within the telecommunications system and carries out particular functions (e.g., billing, telemarketing, etc.). The method also includes the steps of converting the message into a process object, retrieving the link record from the data storage system in accordance with the process object, generating a response message including the link record, and submitting the response message to the requesting system.

According to a final aspect of the present invention, a system for managing and providing customer account information within a telecommunications system is defined. The system includes a data storage system and a processor that is coupled to the data storage system. The processor is operative to store data in the data storage system the data including a first pointer corresponding to a first account record corresponding further to a first service provided by a first system within the telecommunications system; and a second pointer corresponding to a second account record further corresponding to a second service provided by a second system within the telecommunications system. The first account record and the second account record collectively represent a logical customer account record corresponding to a customer within the telecommunications system. The processor is further operative to: receive a message from a requesting system to process the logical customer account record; to convert the message into a process object; to retrieve the first pointer and the second pointer from the data storage system in accordance with the process object; to generate a response message including the first pointer and the second pointer; and to submit the response message to the requesting system.

BRIEF DESCRIPTION OF THE DRAWING FIGURES

The present invention is described with reference to the drawing figures, of which:

FIG. 4A is an illustration of an error message layout according to a preferred embodiment of the present invention;

FIG. 4B is an illustration of a confirmed link of accounts request message layout according to preferred embodiment of the present invention;

FIG. 4C is an illustration of a confirmed link of accounts reply message layout according to a preferred embodiment of the present invention;

FIG. 4D is an illustration of an unlink accounts request message layout according to a preferred embodiment of the present invention;

FIG. 4E is an illustration of unlink accounts reply message layout according to a preferred embodiment of the present invention;

FIG. 4F is an illustration of a view linked accounts query message layout according to a preferred embodiment of the present invention;

FIG. 4G is an illustration of a view linked accounts response message layout according to a preferred embodiment of the present invention;

FIG. 4H is an illustration of a deactivate account message layout according to a preferred embodiment of the present invention;

Figure 1:
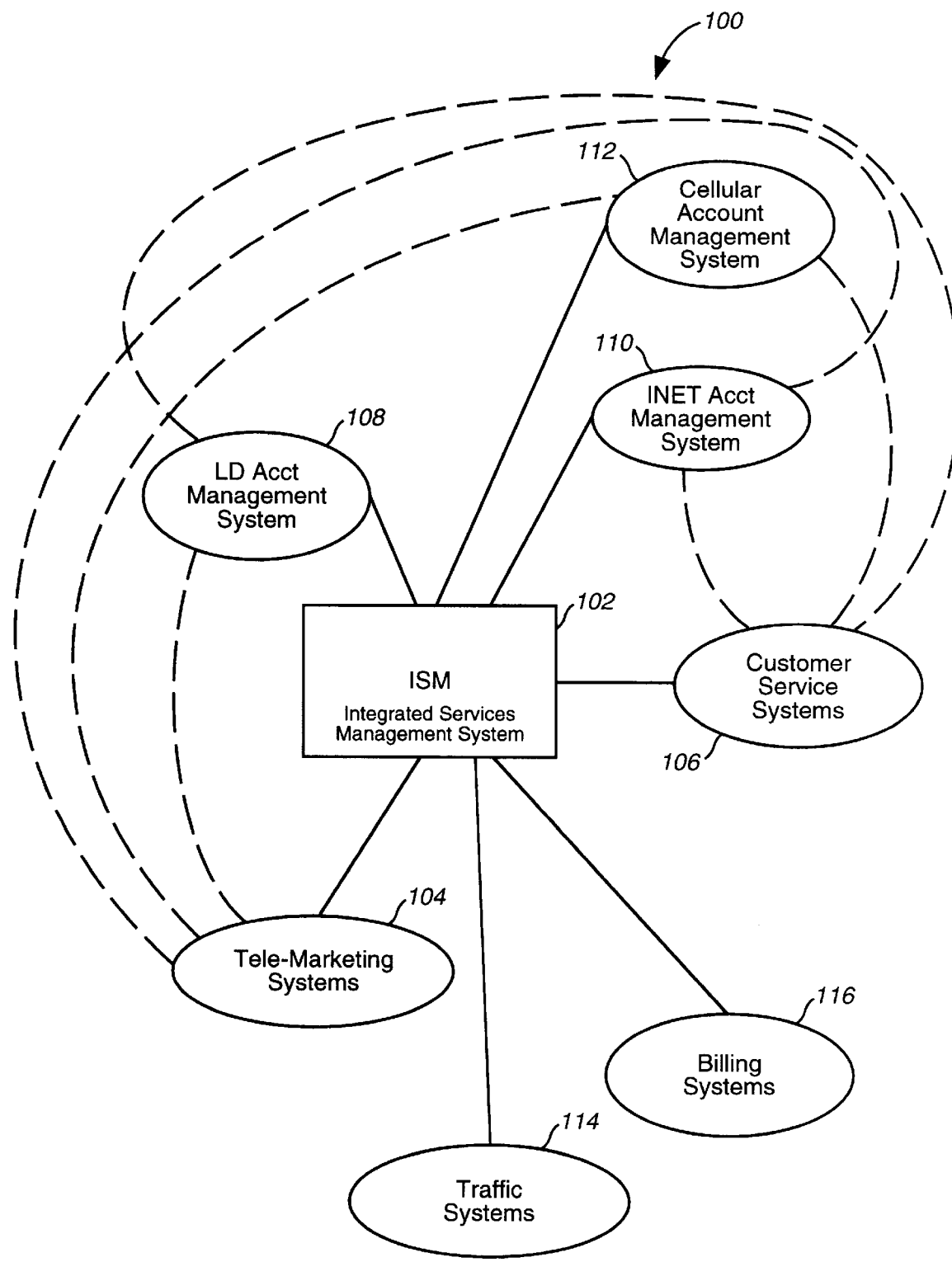
FIG. 1 is system diagram that illustrates an integrated services management system which allows account management among a plurality of telecommunications systems according to a preferred embodiment of the present invention.
Figure 2:
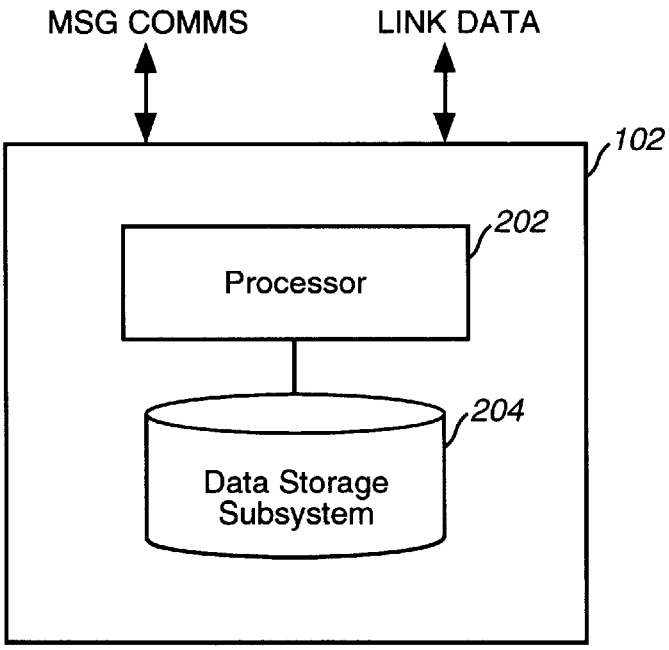
FIG. 2 is a block diagram of the physical structure of the integrated services management system depicted in FIG. 1.
Figure 14:
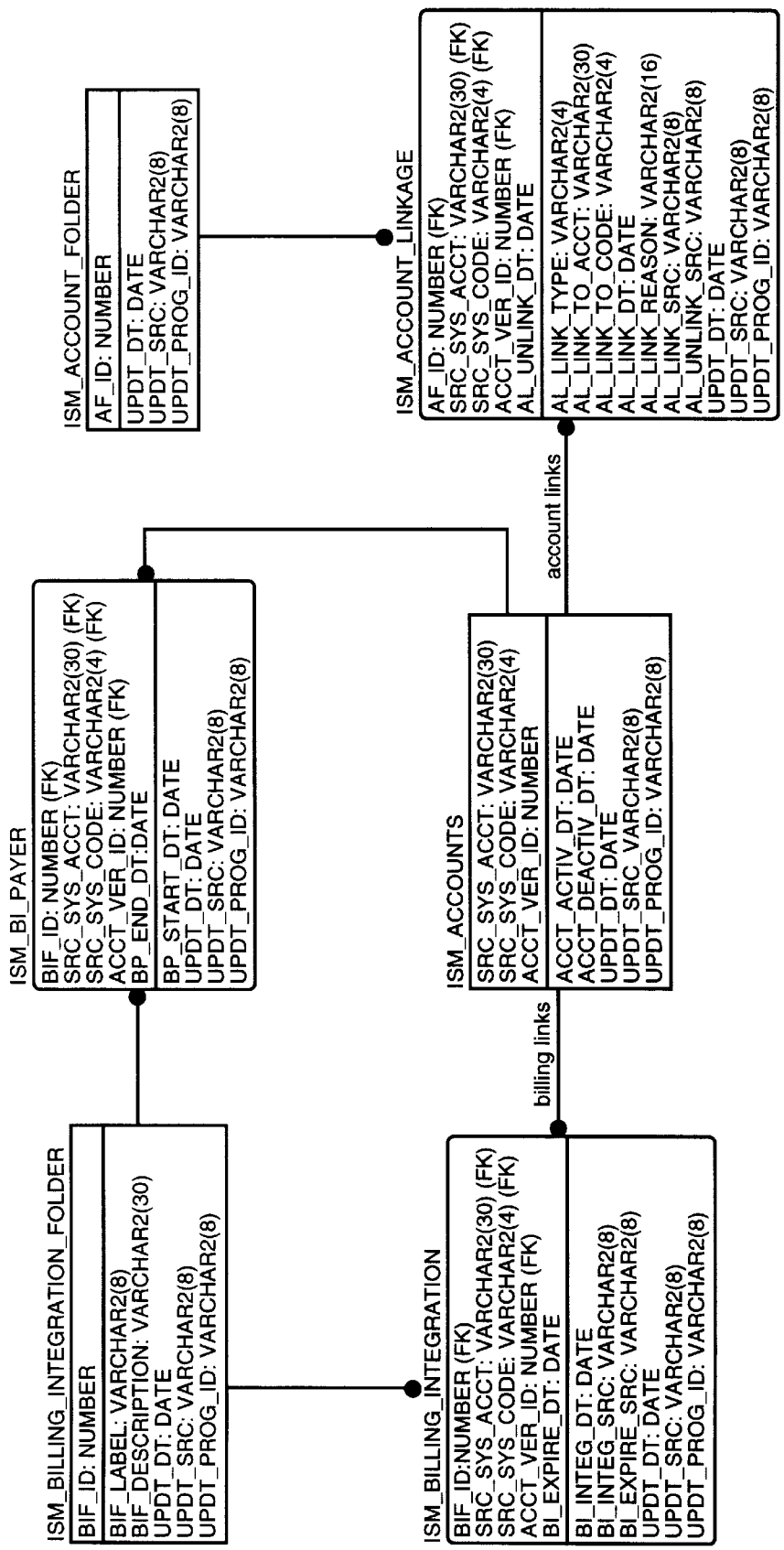
Figure 15:
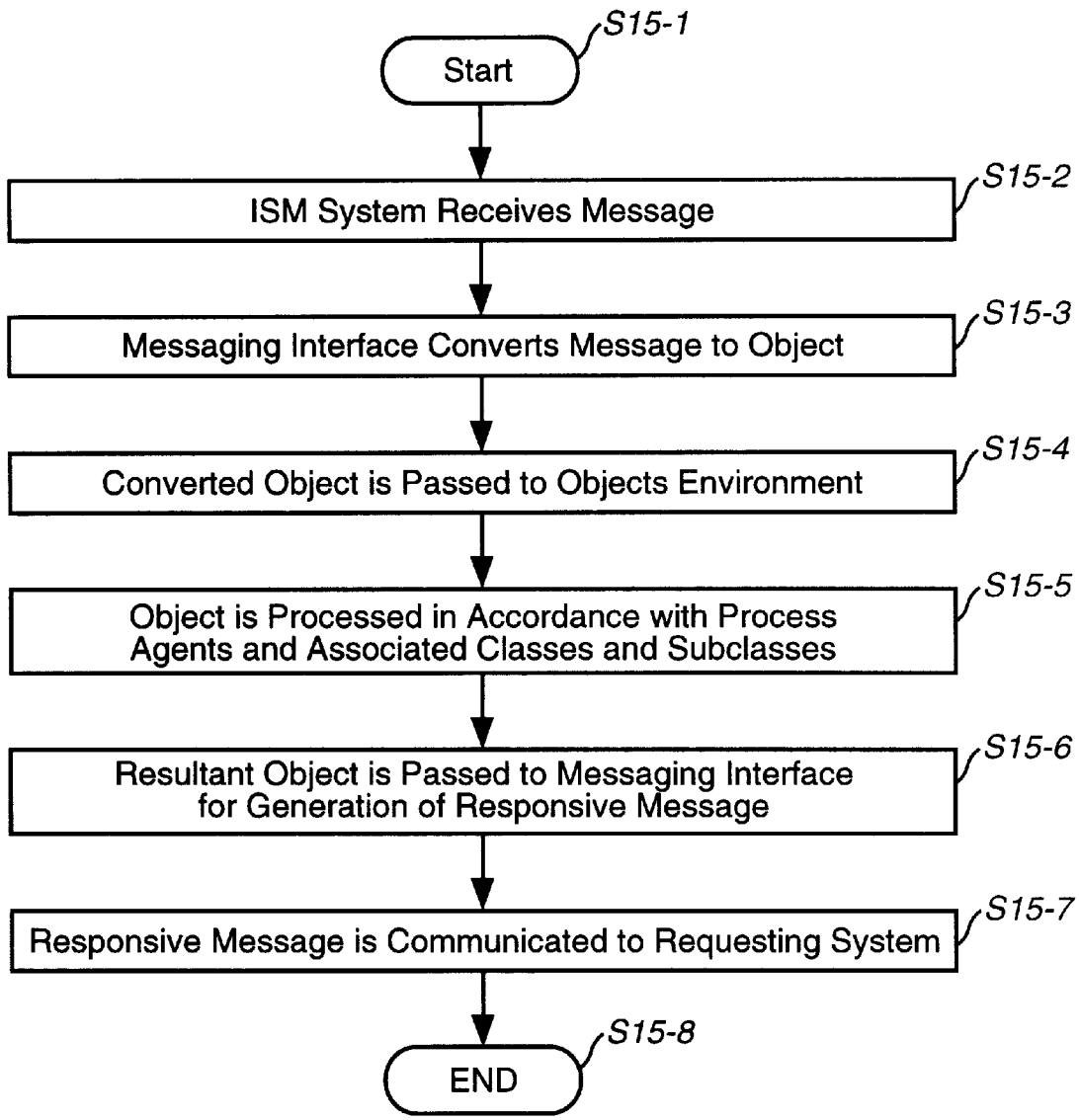

FIG. 14 is a diagram depicting database tables processed within the system depicted in FIG. 1; and FIG. 15 is a flowchart illustrating the operations carried out by the integrated services management system shown in FIG. 2 to process messages to manage links among account records maintained by one or more account management systems within the system depicted in FIG. 1 according to a preferred embodiment of the present invention.

DETAILED DESCRIPTION OF THE PREFERRED EMBODIMENTS

The present invention is now discussed with reference to the drawing figures which were briefly described above. This section includes several subsections which are entitled as follows: (1) SYSTEM OVERVIEW, (2) OBJECT-ORIENTED PROCESSING TO FACILITATE LINKED ACCOUNT MANAGEMENT, (3) DATABASE MANAGEMENT IN AN OBJECT-ORIENTED ENVIRONMENT TO ACHIEVE LINKED ACCOUNT MANAGEMENT, and (4) SYSTEM OPERATION.

Unless otherwise indicated herein, like parts and processes are identified with like reference numerals.

1. SYSTEM OVERVIEW

Referring now to FIG. 1, depicted therein is a system diagram that illustrates an integrated services management system which allows account management among a plurality of telecommunications systems according to a preferred embodiment of the present invention. An exemplary system 100 includes an Integrated Services Management (ISM) System 102, one or more telemarketing systems 104, one or more customer service systems 106, one or more long distance systems associated with one or more long distance (LD) account management systems 108, an Internet services system associated with one or more Internet account management systems 110, one or more cellular telephony systems associated with one or more cellular account management systems 112, one or more traffic processing systems 114, and one or more billing systems 116.

The heart of the present invention is ISM system 102. ISM system 102 includes data processing systems and facilities to create, manage, and process links among related customer accounts which are physically stored and processed on the individual systems that are used to support particular service offerings. That is, ISM system 102 can be considered to store and manage keys or pointers to customer account records that are physically stored on external systems to facilitate links among related customer account records. ISM system 102 allows otherwise disconnected customer account records to be collectively referenced as a logical customer account record by providing a common messaging interface through which numerous, otherwise disconnected systems can communicate with ISM system 102 to store and retrieve key data to customer account records that each individual system may physically store. In addition to a commonly accessed messaging interface, ISM system 102 has facilities to convert messages into objects (e.g., process objects) which may be processed within an object-oriented data processing environment. The object-oriented environment has associated process agents that, among other things, encapsulate business rules and database processes to facilitate central storage, processing, and management of key/pointer data regarding related customer account records stored on other (possibly disparate) systems. In essence, ISM system 102 provides levels of abstraction in a customer account management architecture which allow external systems (e.g., LD account management system 108) to be utilized at a high level (i.e., at a messaging level) without having to worry about low-level database management operations associated with table management and data relationship tracking that is often associated with database management system design and implementation. In the past, it was such database management system design and implementation that caused a significant barrier to providing integrated services as designers had to worry about particular and disparate database structures, processes, and methods across disparate systems.

Further structure and operations related to ISM system 102 are discussed in detail below with regard to many of the attached drawing figures.

Telemarketing system 104 is a typical telemarketing system which may be configured with systems and personnel to facilitate sales and marketing activities related to telecommunications services and the like. Telemarketing system 104 is coupled to the ISM system using conventional networking techniques and topologies (e.g., via TCP/IP links, etc.). For example, telemarketing system 104 may be configured to promote a new cellular telephony service to existing long distance customers. In such a case, telemarketing system 104 may access the ISM system 104 to determine long distance customers who possibly do not already maintain a cellular telephony account. Accordingly, telemarketing entities may contact such customers and attempt to sell cellular telephony services. If services are sold, telemarketing system 104 can message cellular account management system 112 to create appropriate account records and the like. Additionally, telemarketing system 104 can message ISM system 102 to inform ISM system 102 that a new account has been created and that a link between a customer's long distance account is to be made to the customer's new cellular account.

Telemarketing system 104 includes facilities to perform telemarketing activities among existing and new system customers. For example, the role of telemarketing system 104 is to generate new business related to new and existing service offerings which are offered within system 100 (e.g., new cellular services which may be offered to new or existing telephony service subscribers and customers). Telemarketing system 104 is coupled to ISM system 102 to facilitate creation and management of linked customer accounts within system 100.

Customer service system 106 is configured to handle customer service requests and processes on behalf of telecommunications customers. Moreover, like telemarketing system 104, customer service system 106 is configured to access ISM system 102 and the various systems that provide account management relative to particular customer service inquiries handled by customer service system 106. That is, a customer service inquiry may involve the need to examine all service accounts related to a particular customer (e.g., in the case of a customer's request to check account balances and the like). In that case, customer service system 106 will access ISM system 102, receive a list of keys or pointers to one or more account management system data stores (e.g., cellular account management system 112, LD account management system, etc.), and be able to obtain and provide detailed customer service information across multiple systems regardless of platform and architecture. From the vantage point of the customer, a consolidated account management system is in place regardless of the fact that ISM system 102 has enabled such logical consolidation and integration.

As noted above, account management systems like LD account management system 108, Internet account management system 110, and cellular account management system 112, each manage respective database management systems to facilitate account management for customers. It is important to note, however, that each account management system may operate a unique system to facilitate account management and the like. It is ISM system 102 that allows disparate systems to be accessed as if they were integrated by providing a centralized store of link data. The querying of the individual account management systems will now be minimized to fundamental database management routines that will be implemented in accordance with the details of each particular system. There now remains no need to build complicated database management systems that manage and extract data from such dedicated account management systems.

In addition to dynamic, real-time processes like telemarketing and customer service, the present invention is also able to be placed into operating environments where static, batch-type processing may occur. For example, traffic system 114 and billing system 116 may send and receive messages to and from ISM system 102 to facilitate corresponding operations. In particular, billing system 116 may send messages containing requests for accounts to bill on a periodic basis. Such a request message may be responded to by ISM system 102 by providing a list of customers having corresponding sub-lists of pointers to records within account management systems which are to be billed on consolidated account billing statements. Activities such as billing, once appropriate data is located, will be readily understood by those skilled in the art.

The interconnections between the exemplary systems shown in system 100 are intended to incorporate standard network connections and couplings. For example, LD account management system may be connected and coupled to ISM system 102 via one or more typical protocol connections such as a TCP/IP link which will support bidirectional network protocol communications. Accordingly, such interconnections will be readily understood by those skilled in the art of computer system networking and the like.

Referring now to FIG. 2, depicted therein is a block diagram of an exemplary physical arrangement of ISM system 102. In particular, ISM system 102 is configured as a computer automatic data processing system which includes one or more computing nodes. More particularly, ISM system 102 includes one or more processors 202 and one or more data storage subsystems 204. Accordingly, ISM system 102 may be an automatic data processing system similar to or like a SUN SPARC 20 computing system which is manufactured and marketed by SUN MICROSYSTEMS, INC.

It should be understood that ISM system 102 is configured with appropriate communications facilities to facilitate network and other communications. For example, ISM system 102 should be configured with appropriate network communications facilities to allow message communications (discussed below) and link data (e.g., pointers to records within other systems within system 100) to be communicated with other systems within system 100.

Figure 3:
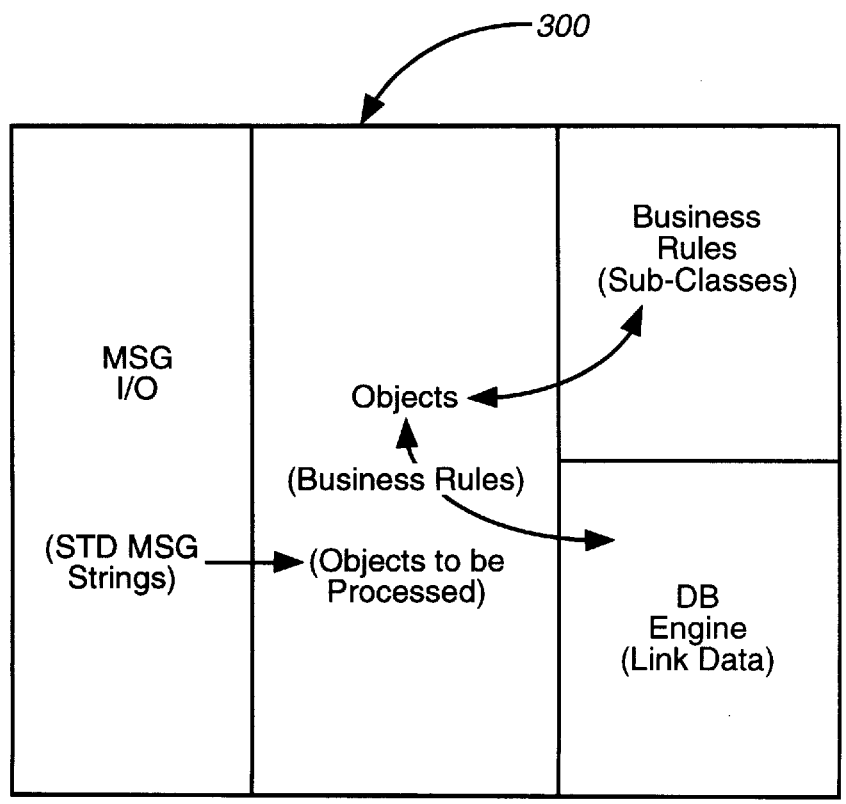
FIG. 3 is a diagram of the logical parts of the integrated services management system depicted in FIG. 2 which are arranged according to a preferred embodiment of the present invention.

Referring now to FIG. 3, depicted therein is a diagram of a logical arrangement of ISM system 102 according to a preferred embodiment of the present invention. In particular, arrangement 300 illustrates a logical configuration of ISM system 102 to facilitate an understanding of how ISM system 102 creates levels of abstraction to allow account management across multiple and different systems independently of platform and account structure. In particular, arrangement 300 includes a messaging interface, an objects section, a business rules data store and a database management facility. Incoming messages (such as for account management) are processed by the messaging interface. Additionally, the messaging interface converts messages into objects which can be processed based on rules within an object-oriented environment. Such objects include constructs to control and operate the database management facility.

The messaging interface is configured to receive strings of data representative of standardized requests for information and the like. Such messages are further described with regard to FIGS. 4A–4J as discussed below.

The objects section is a collection of object processing routines and data structures, including converted messages. Preferably the objects section is implemented using Smalltalk object-oriented programming and processing constructs. The objects section includes code modules (process agents) that encapsulate business rules that control the execution and processing of objects. Such business rules dictate how objects should behave. In essence, business rules can be said to be general, built-in conditions that dictate the flow of execution of particular routines. Examples of business rules according to the present invention include:

Before a link between two accounts can be made, it must be verified that both accounts exist.

The deactivation of an account must not affect any links to that account.

In addition to the objects section, a dedicated business rules data store (i.e., an object database) may also be maintained for storing business rules as sub-classes that may be processed within the object section of ISM system 102 as described in the immediately preceding paragraph.

The database management facility preferably is implemented as an ORACLE database system. The implementation and processing of tables within such a database management system will be readily understood by those skilled in the art. The database management facility is configured to store key/pointer data to account records maintained by the various systems within system 100 (FIG. 1).

By centralizing a data store of key data or links (e.g., associated pointers) to records within various account management systems so that consolidated customer views may be realized and by standardizing a messaging interface, ISM system 102 creates levels of abstraction that allow multiple (possibly disparate) systems to integrate and appear as a homogenous arrangement of account management systems.

The following paragraphs describe the standardized messages that are illustrated in FIGS. 4A–4I and which are communicated among the systems within system 100. FIG. 4J illustrates a sample view link message according to the present invention.

Every message passed within system 100 will have the following format:
Registry Header (fixed size)
ISM Message Header (fixed size)
ISM Message Body (variable size)

The ISM message header section of a message has the following format:

| Message ID | CHAR 8. |
| --- | --- |
| Message Size | CHAR 8. |
| Response Code | CHAR 8. [e.g. ERROR, SUCCESS] |

The ISM message header is the message header for all new messages sent to ISM system 102 for processing. The Message ID and Message Size are required input for every message. ISM system 102 will return the Response Code, Reason Code and Error Description for all converse and asynchronous messages.

The ISM Message Body will have different formats depending upon the Message ID and (for response messages) whether the input message was successful. For example, a message request to perform a View Linked Accounts Query has the following format:

| Account Number | CHAR 30 |
| --- | --- |
| Account System Code | CHAR 4 |

The aforementioned character counts (identified as CHAR n, where n may be a number of bytes) indicate the length in characters of the data specified. The messaging interface within ISM system 102 will break down the messages based on the aforementioned structures and convert broken down messages received into objects and vice versa for submission to external systems.

It is important to note that messaging within the present invention and in system 100 follows a basic paradigm: For every message there will be a response. Accordingly, the standardized, exemplary messages illustrated in FIGS. 4A–4I are often paired message groups containing a message and a corresponding response.

Figures 4I, 4J:
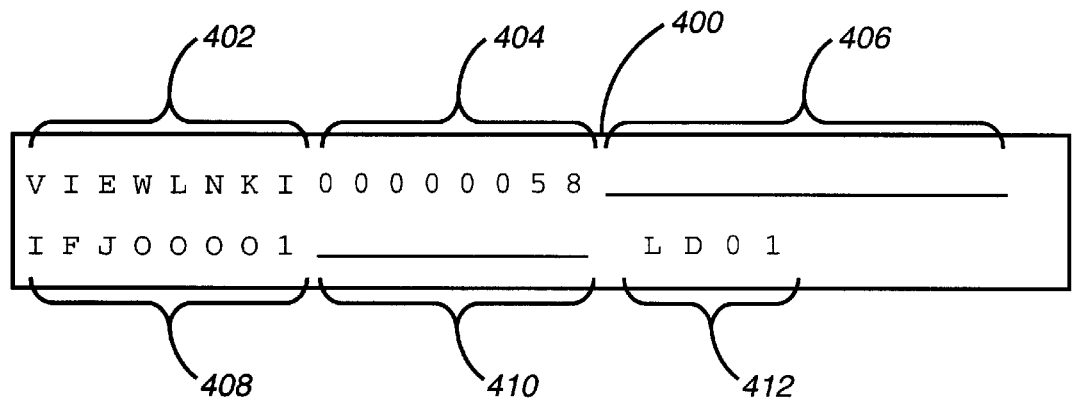
FIG. 4I is an illustration of a reactivate account message layout according to a preferred embodiment of the present invention.
FIG. 4J is an illustration of a sample view linked accounts message communicated within the system depicted in FIG. 1.

Referring now to FIG. 4J, depicted therein is a sample message that has been formatted as a View Linked Accounts Query. In particular, message 400 is a character string (i.e., a byte string) that contains a message identifier 402, a size indicator 404, a response code section 406 (which will be empty in a request message from a requesting system), a customer account number 408, an extra-space section 410 to store more digits or characters of a customer's account number, and a requesting system identifier 412. Message 400 is a View Linked Accounts Query message that originated from a requesting system having an identifier of "LD01" (i.e., in this case, a long distance account management system known as System 01). It is important to note that the customer account number may be supplied by telemarketing system 102 or customer service system 106 or any other system that may interact with ISM system 102.

After message 400 has been delivered to ISM system 102, and after appropriate processing has occurred in accordance with message 400, ISM system will place a response code in response code 406. Further details regarding the processing that occurs with ISM system 102 in accordance with a message like message 400 are discussed in detail below.

(2) OBJECT-ORIENTED PROCESSING TO FACILITATE LINKED ACCOUNT MANAGEMENT

The message formats illustrated in FIGS. 4A–4I and the sample message illustrated in FIG. 4J are configured to accept strings of characters that are to be processed by ISM system 102 (FIG. 1) to determine key or pointer data that points to account records within external account management systems. To achieve such functionality, ISM system 102 and, in particular, the messaging interface section of arrangement 300 thereof is configured to translate or convert messages into objects which can be processed within an object oriented environment such as one implemented in the Smalltalk programming language. The programming necessary to convert from a messaging data structure to an object data structure will be readily understood by those skilled in the art of object-oriented design and implementation.

Messages formed and passed in accordance with the formats illustrated in FIGS. 4A–4K are intended to be processed in accordance with the objects and classes illustrated in FIGS. 5–13.

Figure 5:
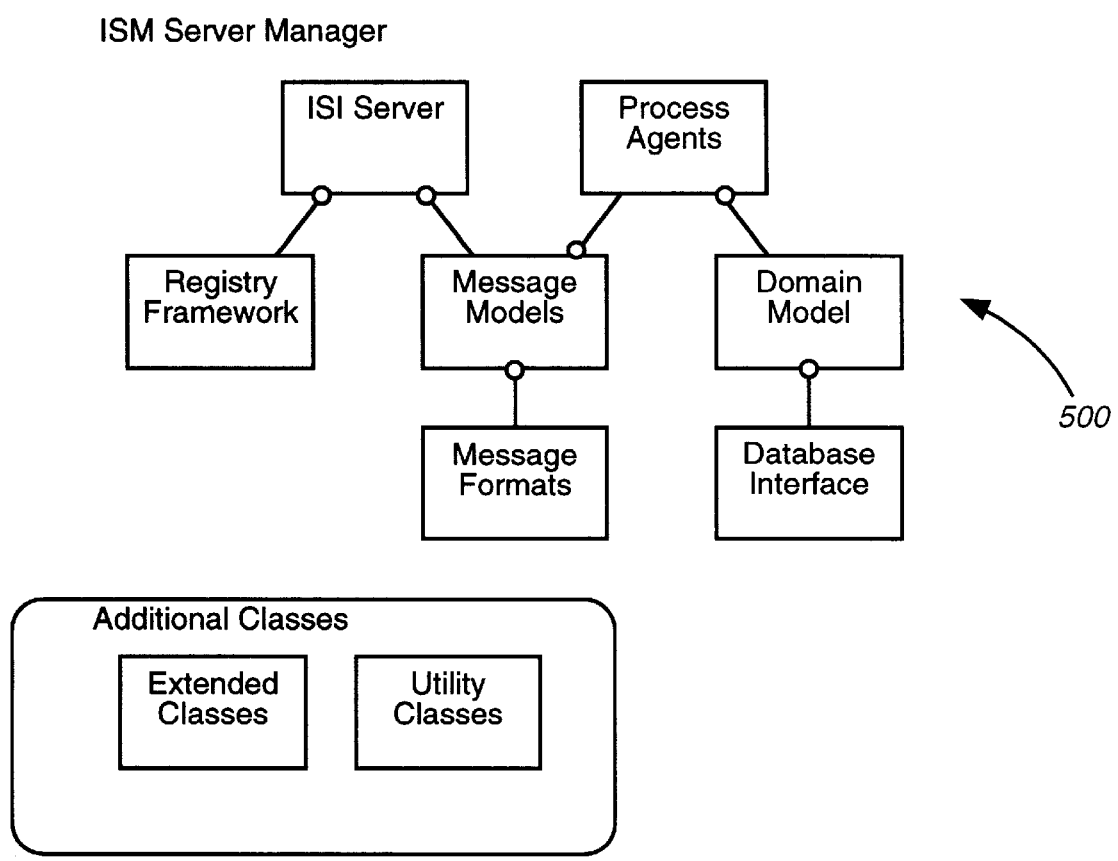
FIG. 5 is an overall class diagram corresponding to the object oriented structures created and processed within the system depicted in FIG. 2.

Referring now to FIG. 5, depicted therein is an overall class diagram corresponding to the object-oriented structures created and processed within system 100 (FIG. 1). In particular, object-oriented system 500 (which exists in the objects section of FIG. 3) includes an intelligent systems interface (ISI) server and process agents. A registry framework, message models, and a domain model are subclasses of the registry ISI server and the process agents class. A message formats class contains data structures corresponding to the message formats illustrated in FIGS. 4A–4I. A database interface class is subordinate to the domain model.

Figure 6:
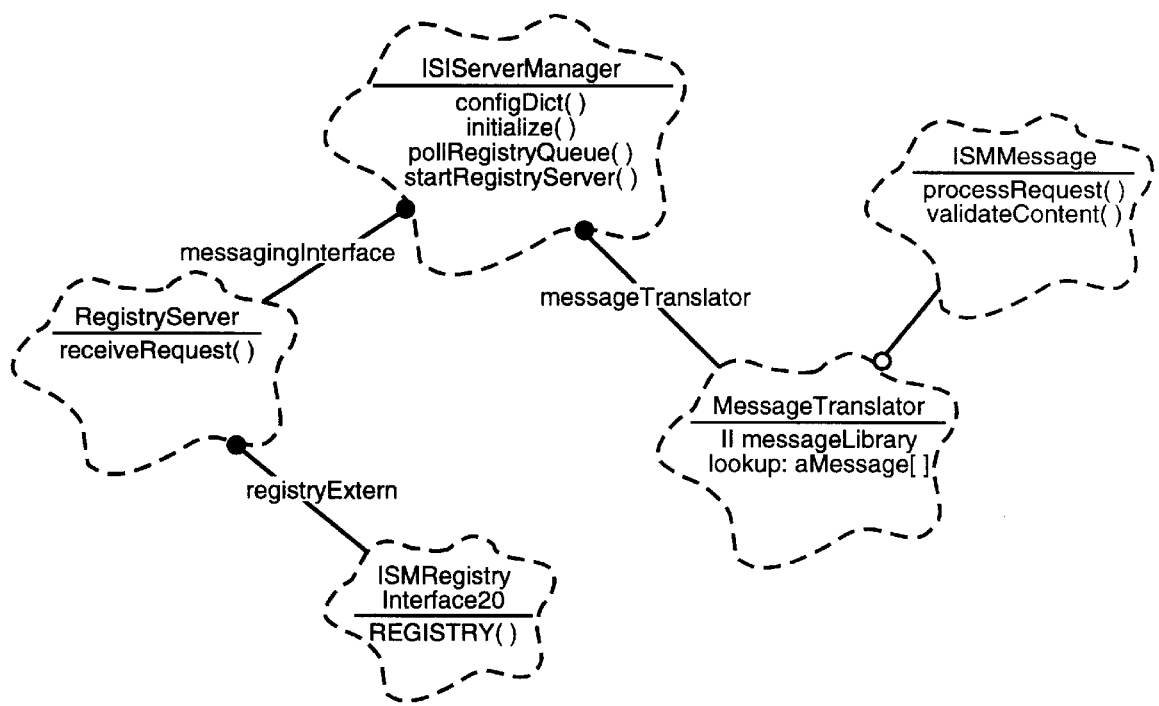
FIG. 6 is a class diagram of a server class according to a preferred embodiment of the present invention.

Referring now to FIG. 6, depicted therein is a class diagram of the ISI server class illustrated in FIG. 5.

Figure 7:
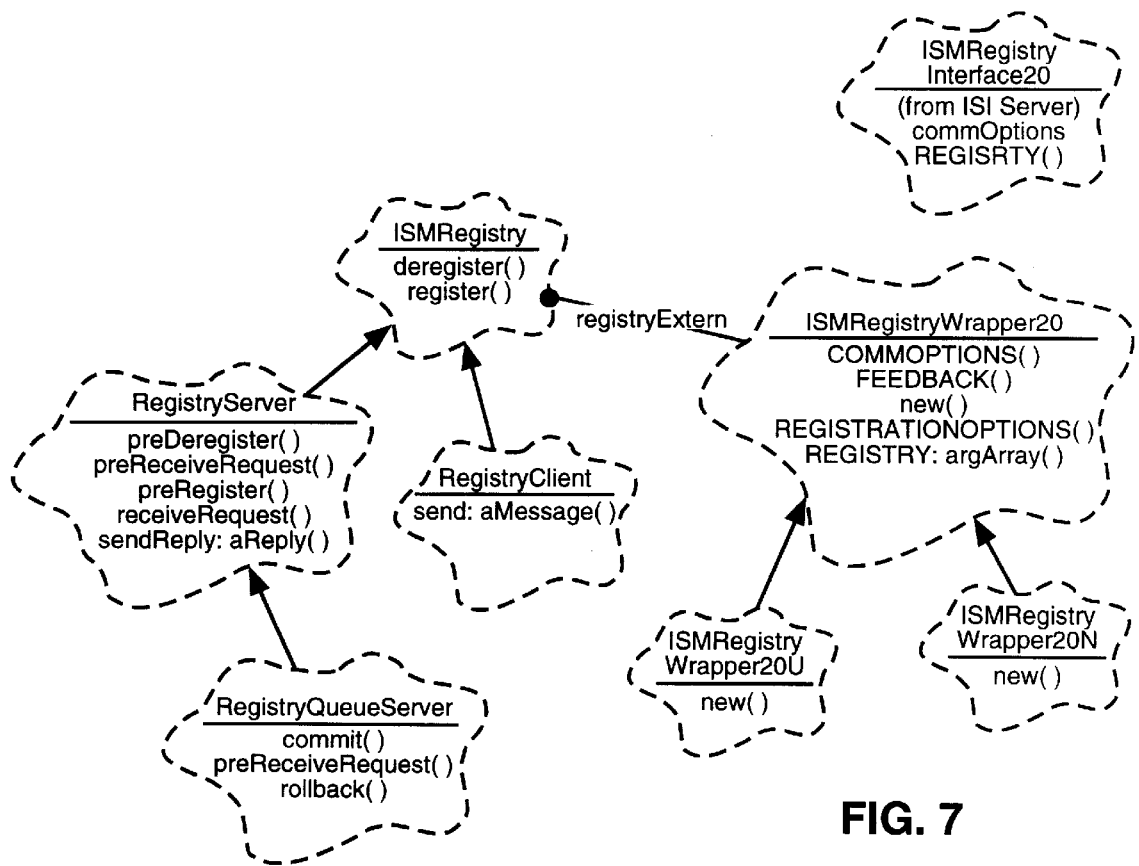
FIG. 7 is a registry framework class diagram according to a preferred embodiment of the present invention.

Referring now to FIG. 7, depicted therein is a class diagram of the registry framework class illustrated in FIG. 5.

Figure 8:
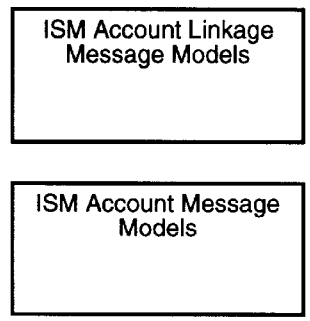
FIG. 8 is a chart illustrating the message models processed within the system depicted in FIG. 2.

Referring now to FIG. 8, depicted therein is a class diagram of the message models class illustrated in FIG. 5. The message models class has two sub-classes consisting of an account linkage message models class and an account message models class.

Figure 9:
FIG. 9 is a diagram of an account linkage message model according to a preferred embodiment of the present invention.

Referring now to FIG. 9, depicted therein is a class diagram of the account linkage message model class illustrated in FIG. 8.

Figure 10:
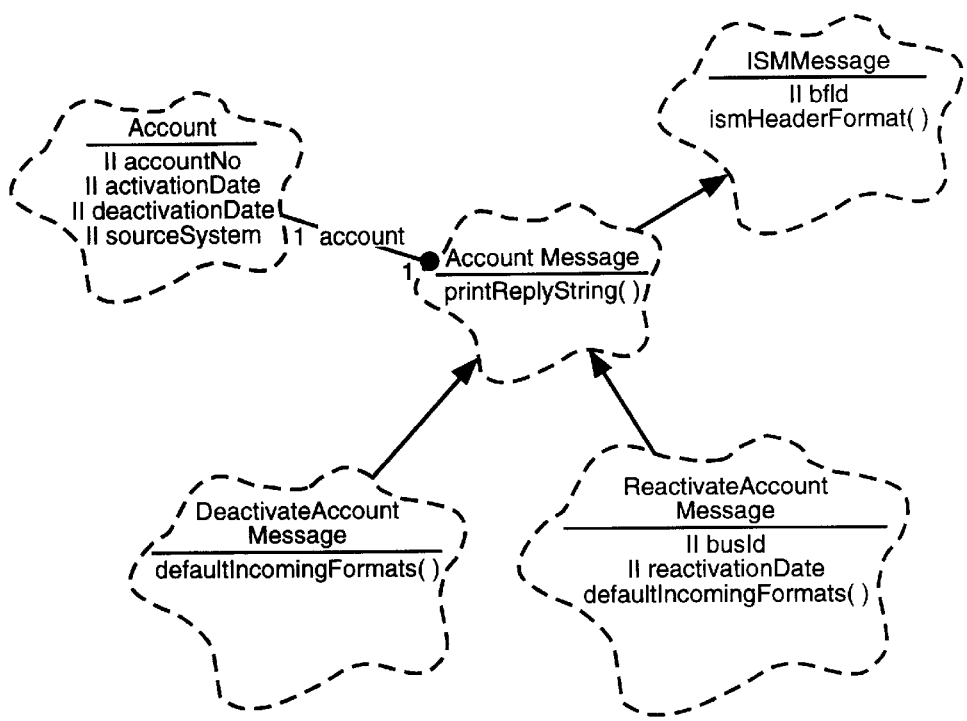
FIG. 10 is a diagram of an account message model according to a preferred embodiment of the present invention.

Referring now to FIG. 10, depicted therein is a class diagram of the account message models class illustrated in FIG. 8.

Figure 11:
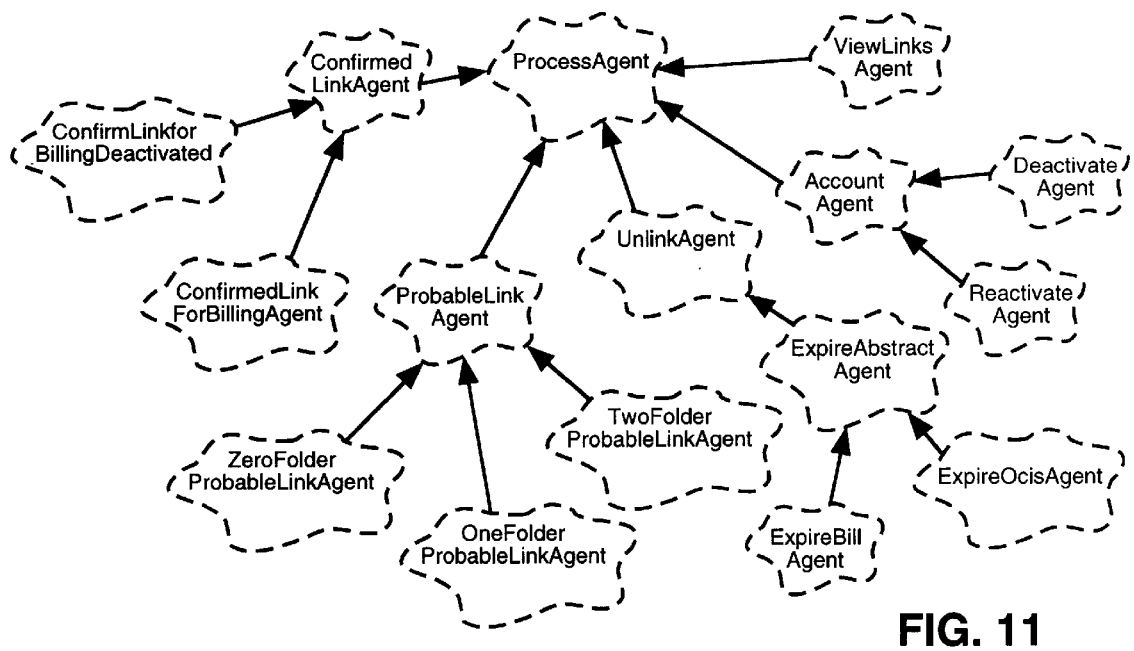
FIG. 11 is a diagram that depicts account linkage process agents that may be executed within the system depicted in FIG. 2.

Referring now to FIG. 11, depicted therein is a class diagram of the process agents referred to in FIG. 5.

Figure 12:
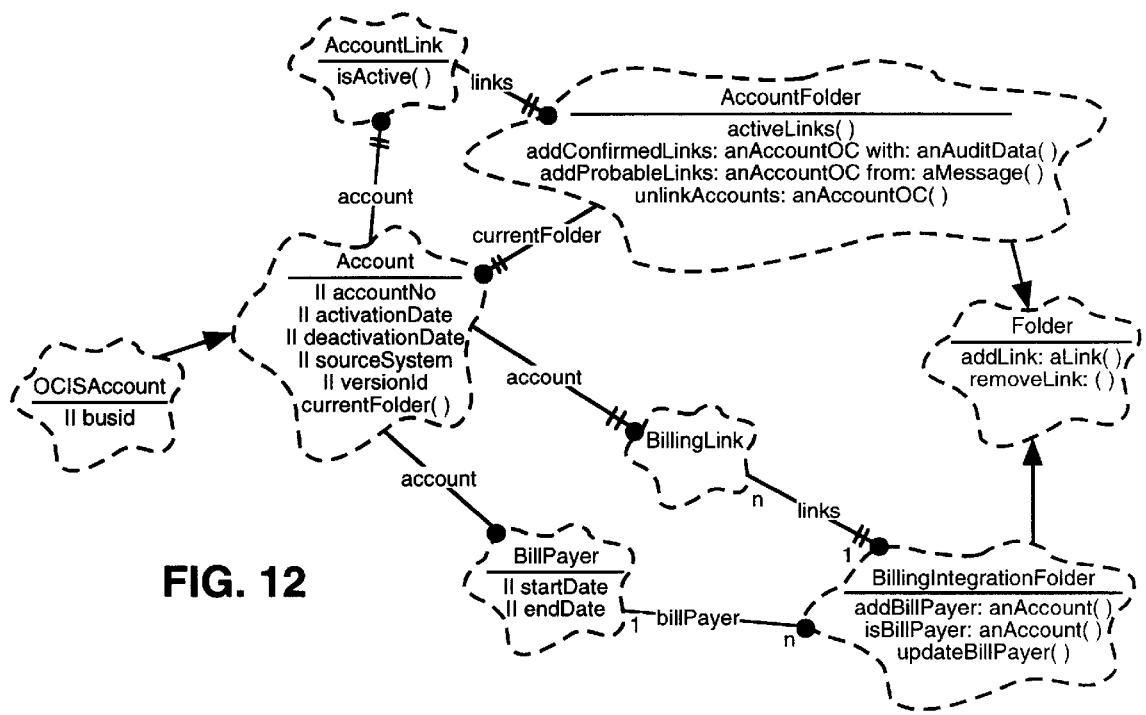
FIG. 12 is a diagram that depicts a class diagram of a domain model that illustrates entity relationships between an object-oriented environment and a database environment.

Referring now to FIG. 12, depicted therein is a class diagram of a domain model that illustrates entity relationships between an object-oriented environment and a database environment.

Figure 13:
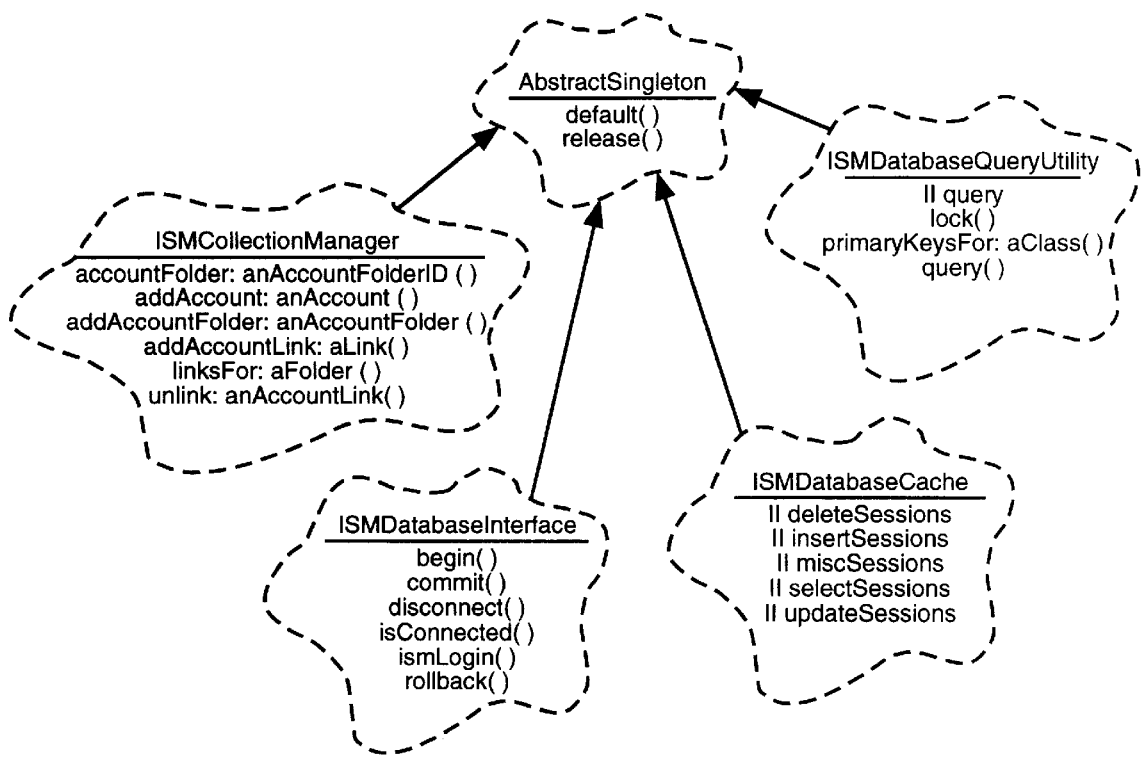
FIG. 13 is a diagram that depicts an object oriented scheme for providing a database interface according to a preferred embodiment of the present invention.

Referring now to FIG. 13, depicted therein is a class diagram corresponding to the database interface class illustrated in FIG. 5.

The programming constructs and data structures that are necessary to build objects and classes in accordance with those illustrated in FIGS. 5–13 will be readily understood by those skilled in the art of object-oriented computer programming.

(3) DATABASE MANAGEMENT IN AN OBJECT-ORIENTED ENVIRONMENT TO ACHIEVE LINKED ACCOUNT MANAGEMENT

Once messages are communicated and converted into classes as described above, they may indicate that a database management task is to take place. For example, a VIEW LINKED ACCOUNTS QUERY message (FIG. 4F) may be received by ISM system 102 by which a database query is requested. In that case, a database query will be caused to occur against database tables managed by ISM system 102.

It is important to note again, however, the ISM system 102 does not actually store the contents of account records; such are stored by the account management systems that correspond to particular service provision systems. Instead, the databases maintained by ISM system 102 are databases of link data. In other words, the database management facilities of ISM system store and manage key data and pointers to records within appropriate account management systems that are coupled to ISM system 102. In any case, the classes and process agents illustrated in FIG. 12 are intended to provide a layer of translation from an object domain to a relational database domain so that appropriate database management tasks may be carried out.

Accordingly, when a database query or operation is to be performed with ISM system 102, appropriate structured query language (SQL) statements and expressions may be carried out against appropriate database tables. Such tables are illustrated in FIG. 14. Those statements are facilitated by classes within the objects section of the arrangement illustrated in FIG. 3 and are summarized as follows:

ISMDataModel

DESCRIPTION:

ISM system 102 database schema, along with the Smalltalk classes to which tables in the schema are mapped, are stored in this class. The mapping is generated by using a Data modeling tool that is manufactured and marketed by the ParcPlace-Digitalk Corporation. This is a subclass of LensMainApplication manufactured which is manufactured and marketed by ParcPlace-Digitalk Corporation. This is a standard way of defining or mapping the database tables to Smalltalk classes using Lens.

USAGE:

Reference should be made to the ParcPlace documentation for Lens (Visual Works Versions 2.51) for more details to create a data model using data modeling tool.

ISMDatabaseQueryUtility

DESCRIPTION:

This class is capable of generating SQL to delete, update, insert and select from a table to/from the ORACLE database. Input is a database entity object whose class is mapped to a database table in the data model. For deletes and selects all the non-nil fields are used in the where clause. All the columns from the table are selected on selects. For updates, the primary keys (as defined in the data model) are used for the where clause and all other non-nil fields are used in the set clause of the update SQL statement. For inserts, all the fields are written to the database. Note that nil is written as NULL in the database.

General purpose SQL will be generated, meaning instead of using actual values in the SQL, parameters are used. An example of general purpose SQL is:

'SELECT UPDT_DT, UPDT_SRC FROM ISM_ACCOUNT_FOLDER WHERE AF_ID=:1'

The actual values are bound to the parameters at execution time. The binding values can be generated using the method bindingsForTemplate: aDatabaseEntity. The parameter corresponds to the index of the instance variable of the object mapped to the table.

There are four public methods under the protocol SQL generation, to generate four different types of SQL. This class reads the table to object mappings from the currentSession instance variable of ISMDatabaseInterface default.

USAGE:

This class should be used as a singleton. Sole instance can be accessed by sending default message to the class. Log into the database before using this class to generate SQL. For example, to generate insert SQL for anIsmAccounts object follow the steps given below.

log into the database

ISMDatabaseInterface default ismLogin create the object and pass the object to ISMDatabaseQueryUtility default to generate SQL ISMDatabaseQueryUtility default insertSQLForTemplate: IsmAccounts new This would generate:

INSERT INTO ISM.ISM_ACCOUNTS (SRC_SYS_ACCT,SRC_SYS_CODE,ACCT_VER_ID, ACCT_ACTIV_ DT,ACCT_DEACTIV_DT, UPDT_DT,UPDT_SRC,UPDT_PROG_ID) VALUES (:1,:2,:3,:4,:5,:6,:7,:8)

ISMDatabaseCache

DESCRIPTION:

This class is used as a central cache for all the SQL statements executed.

When a SQL statement is processed by Oracle, the first thing Oracle does is parse the SQL and compile the SQL into binary code. This initial process is called "preparing SQL". On preparation of a SQL statement, Oracle returns an instance of the class Oracle Session which points to the compiled SQL. If there is a need to execute the same SQL later, one could just execute the compiled code stored in the Oracle Session. Preparing SQL takes about 40% of the total execution time for a SQL statement and caching the prepared sessions is a good optimization tool.

An instance of this class is able to prepare SQL and cache in the prepared OracleSession for further use.

Internally this class maintains five dictionaries: selectSessions, updateSessions, insertSessions, deleteSessions and miscSessions. These dictionaries are used to cache prepared sessions for selects, updates, inserts, deletes and miscellaneous SQL statements, respectively. There are only four public methods under the protocol accessing sessions to query each of these dictionaries. When a database entity object is passed in as an argument to these methods, a prepared session for that object will be returned. With the exception for miscellaneous sessions, there is a need to pass in the whole SQL which is used as a key in the dictionary. For other sessions, the key is generated by the class name of object concatenated with the index of the non-nil instance variable names. If the key is found, the value, a prepared session is returned. If key not found, SQL is generated, prepared and cached before returning the session.

USAGE:

This class should be used as a singleton. Sole instance can be accessed by sending default message to the class. Log into the database before using this class. For example, to get a prepared session for inserting an object (anIsmAccounts) follow the steps below log into the database ISMDatabaseInterface default ismLogin create the object and pass the object to ISMDatabaseCache default ISMDatabaseCache default insertSession: IsmAccounts new This would return an instance of OracleSession with all the information necessary for execution.

ISMDatabaseInterface

DESCRIPTION:

An instance of this class provides a single point for all database statement executions. This provides protocols for:
  logging into the database
  preparing and executing SQL and PLSQL
  database transaction management
  adding, deleting, updating and selecting objects from database This class also handles database errors. There is an exception handler for every database call. On an exception, a rollback is sent to the database and the exception is rejected assuming that there is another signal to capture the actual error.

This is a public class, all the database requests should be submitted through this class. There are four public protocols:
  connection includes methods for logging into database
  execution includes methods for executing a SQL or PLSQL statement or prepared sessions
  transaction includes methods for database transactions like commit, rollback etc.
  data processing includes methods for adding, deleting and updating objects

USAGE:

This class should be used as a singleton. Sole instance can be accessed by sending default message to the class.

ISMLensSession

DESCRIPTION:

An instance of this class controls what happens within a database transaction. All database requests within a transaction are internally queued and submitted to the database on commit. Internally there are three orderedCollections to cache objects to be added, deleted and updated. On commit, the deletes, updates and inserts are done in that order.

This class is responsible for rolling back the database if any of the requests fail within a transaction. An instance of this class is held by ISMDatabaseInterface.

USAGE:

This class is private and should not be accessed directly.

ISMCollectionManager

DESCRIPTION:

This class acts as a facade for all the database operations. Domain specific database access code is encapsulated in this class. A public method for each of the domain specific database processing is added on this class which can be called by the domain objects for database operations.

USAGE:

This class should be used as a singleton. Sole instance can be accessed by sending default message to the class.

In terms of operation, the aforementioned classes operate and process data to bring about database management functionality within system 100. Such functionality is now described with reference to a exemplary case as follows:

CASE:

To process a confirmed link message (e.g., a CONFIRMED LINK OF ACCOUNTS REQUEST "CONLINKI" as illustrated in FIG. 4B) the following operations are required: add an account folder, add two accounts, three new account links and delete an account link from the database.

The following Steps will be carried out within ISM system 102 in regard to the present CASE:

A. Log into the database through ISMDatabaseInterface

---

ISMDatabaseInterface default connectWithUser: 'ism' withPassword: '********'
withEnvironment: 'ismdvft'
CORRESPONDING RESULT: Log into the database and get an Oracle database connection.

---

B. Begin a database transaction by issuing begin to ISMDatabaseInterface

---

ISMDatabaseInterface default begin
CORRESPONDING RESULT: ISMDatabaseInterface asks currentSession (an ISMLensSession) to begin a transaction. ISMDatabaseInterface gets sysdate from Oracle and caches it.

---

C. Issue add: anObject, update: anObject, or delete: anObject to ISMDatabaseInterface to add, update and delete anObject respectively as required.

---

ISMDatabaseInterface default.
  add: anIsmAccountFolder;
  add: anIsmAccount1;
  add: anIsmAccount2;
  add: anIsmAccountLinkage1;
  add: anIsmAccountLinkage2;
  add: anIsmAccontLinkage3;
  delete: anIsmAccountLinkage4.
CORRESPONDING RESULT: add: and delete: messages sent to ISMDatabaseInterface are redirected to currentSession. CurrentSession caches in all the objects to be added and deleted in separate collections D. Issue a commit to database through ISMDatabaseInterface

---

ISMDatabaseInterface default commit
CORRESPONDING RESULT: Commit is forwarded to currentSession of
ISMDatabaseInterface. For each of the objects to be added or deleted, ISMLensSession
asks ISMDatabaseCache for a preparedSession. If a similar object was added or deleted
before, the databaseCache will have a preparedSession cached which will be returned. If
it is the first time an object similar to the requested one is added or deleted,
ISMDatabaseCache will ask the ISMDatabaseQueryUtility to generate appropriate SQL
for that object. This SQL is passed to ISMDatabaseInterface for preparation. The
returned prepared session is cached in the ISMDatabaseCache before giving it to the
ISMLensSession. The prepared session is executed after binding the values from the
object. After processing all the database requests, a commit is sent to the database.

---

(4) SYSTEM OPERATION

The structure implemented and deployed within system 100 operates together to allow standardized messages to be communicated and processed to bring about corresponding linked account functionality. Accordingly, to further illustrate the operations that are carried out within system 100 and, in particular, by ISM system 102, to process messages to manage account linkages, reference is now made to FIG. 15.

Depicted in FIG. 15 is a flowchart that illustrates the operations carried out by the integrated services management system shown in FIGS. 2 and 3 to process messages and to manage links among account records maintained by one or more account management systems within the system depicted in FIG. 1 according to a preferred embodiment of the present invention. In particular, processing starts at Step S15-1 and immediately proceeds to Step S15-2.

At Step S15-2, ISM system 102 will receive a message from a requesting system. The message will have the format and contain corresponding information as described above in regard to FIGS. 4A–4J.

Next, processing proceeds to Step S15-3, where ISM system 102 and, in particular, the messaging interface thereof (FIG. 3) will convert the character string message into an object to be processed within the object-oriented environment of ISM system 102. Thereafter, the converted object will be passed to the object-oriented environment at Step S15-4

Next, at Step S15-5, the converted object will be processed in accordance with appropriate classes and process agents as described above. For example, the converted object may call for ISM system 102 to deliver all accounts related to a particular customer. In such a case, the appropriate database management process agents will be executed to cause corresponding database management system operations (e.g., Oracle Database operations) to commence.

Thereafter, at Step S15-6, resultant object will be passed to the messaging interface of ISM system 102 (FIG. 3). The messaging interface will generate an appropriate response message (e.g., a responsive character string message). And, at Step S15-7, the responsive message will be communicated to the requesting system. The requesting system can then parse the responsive message to obtain link data (e.g., keys, pointers, etc.) to access account records within account management systems that are coupled to ISM system 102.

Processing ends at Step S15-8.

Thus, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in and covered by the appended claims.

What is claimed is:

1. A system for managing and providing customer account information within a telecommunications system and for providing an interface between a requesting system and at least one database, the interface having an object-oriented programming software module for application of business rules to a message from the requesting system and said customer account information, comprising:
   a data storage system storing a link record corresponding to a customer account managed by an account management system maintained within said telecommunications system; and
   a processor coupled to said data storage system and operative to receive a message containing a process request related to said customer account from said requesting system, to convert said message into a process object by applying said module to said message, to retrieve said link record from said data storage system in accordance with said process object, to generate a response message including said link record, and to submit said response message to said requesting system so that said requesting system can communicate with said at least one database using said link record.

2. The system according to claim 1, wherein said link record contains a pointer corresponding to a customer account record managed by said account management system.

3. The system according to claim 1, wherein said customer account corresponds to a telephony service account.

4. The system according to claim 3, wherein said telephony service account is a long distance telephone service account.

5. The system according to claim 1, wherein said message is a string of characters and said at least one database includes a plurality of databases having at least one different format.

6. The system according to claim 1, wherein said requesting system is a customer service facility.

7. The system according to claim 1, wherein said process request is a customer account query.

8. The system according to claim 1, wherein said requesting system is a telemarketing facility.

9. The system according to claim 1, wherein said process object is an object-oriented data processing object configured as a process agent.

10. The system according to claim 1, wherein said process object contains a business rule defining how said process object should execute.

11. The system according to claim 10, wherein said business rule relates to said link record.

12. A method for managing and providing customer account information within a telecommunications system and for providing an interface between a requesting system and at least one database, the interface having an object-oriented programming software module for application of business rules to a message from the requesting system and said customer account information, comprising the steps of:

storing a link record corresponding to a customer account in a data storage system, said customer account managed by an account management system maintained within said telecommunications system;

receiving a message from a requesting system, said message containing a process request related to said customer account, said requesting system maintained within said telecommunications system;

converting said message into a process object by applying said module to said message;

retrieving said link record from said data storage system in accordance with said process object;

generating a response message including said link record; and submitting said response message to said requesting system so that said requesting system can communicate with said at least one database using said link record.

13. The method according to claim 12, wherein said link record contains a pointer corresponding to a customer account record managed by said account management system.

14. The method according to claim 12, wherein said customer account corresponds to a telephony service account.

15. The method according to claim 14, wherein said telephony service account is a long distance telephone service account.

16. The method according to claim 12, wherein said message is a string of characters and said at least one database includes a plurality of databases having at least one different format.

17. The method according to claim 12, wherein said requesting system is a customer service facility.

18. The method according to claim 12, wherein said process request is a customer account query.

19. The method according to claim 12, wherein said requesting system is a telemarketing facility.

20. The method according to claim 12, wherein said process object is an object-oriented data processing object configured as a process agent.

21. The method according to claim 12, wherein said process object contains a business rule defining how said process object should execute.

22. A system for managing and providing customer account information within a telecommunications system and for providing an interface between a requesting system and at least one database, the interface having an object-oriented programming software module for application of business rules to a message from the requesting system and said customer account information, comprising:

a data storage system; and a processor coupled to said data storage system and operative to store data in said data storage system, said data including a first pointer corresponding to a first account record corresponding to a first service provided by a first system within said telecommunications system, a second pointer corresponding to a second account record corresponding to a second service provided by a second system within said telecommunications system, said first account record and said second account record collectively representing a logical customer account corresponding to a customer within said telecommunications system, said processor further operative to receive a message from a requesting system to process said logical customer account, to convert said message into a process object by applying said module, to retrieve said first pointer and said second pointer from said data storage system in accordance with said process object, to generate a response message including said first pointer and said second pointer, and to submit said response message to said requesting system so that said requesting system can communicate directly with said at least one database.

23. The system according to claim 22, wherein said message is a string of characters having a predefined format and said at least one database includes a plurality of databases having at least one different format.

24. The system according to claim 22, wherein said requesting system is a customer service facility.

25. The system according to claim 22, wherein said process request is a customer account query.

26. The system according to claim 22, wherein said requesting system is a telemarketing facility.

27. The system according to claim 22, wherein said process object is an object-oriented data processing object configured as a process agent.

28. The system according to claim 22, wherein said process object contains a business rule defining how said process object should execute.

* * * * *